(12) United States Patent
Shimizu et al.

(10) Patent No.: US 6,186,259 B1
(45) Date of Patent: Feb. 13, 2001

(54) AUTOMATIC STEERING DEVICE FOR VEHICLES

(75) Inventors: Yasuo Shimizu; Katsuhiro Sakai, both of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/152,679

(22) Filed: Sep. 14, 1998

(30) Foreign Application Priority Data

Sep. 16, 1997 (JP) .................................................. 9-250206

(51) Int. Cl.$^7$ ................................. B60S 9/00; B62D 1/26; B62D 5/00
(52) U.S. Cl. ........................... 180/204; 180/401; 180/404; 180/407; 701/42
(58) Field of Search ..................... 180/204, 401, 180/404, 405, 407; 701/41, 42

(56) References Cited

U.S. PATENT DOCUMENTS

| | | | |
|---|---|---|---|
| 5,065,325 | * 11/1991 | Takahashi | 180/404 |
| 5,303,156 | * 4/1994 | Matsuoka et al. | 180/404 |
| 5,400,250 | * 3/1995 | Ohmura | 180/404 |
| 5,764,015 | * 6/1998 | Shimizu et al. | 180/204 |
| 5,931,252 | * 8/1999 | Shimizu et al. | 180/204 |
| 5,931,253 | * 8/1999 | Shimizu et al. | 180/204 |
| 5,957,232 | * 9/1999 | Shimizu et al. | 180/204 |
| 6,012,541 | * 1/2000 | Nishioka et al. | 180/404 |
| 6,016,881 | * 1/2000 | Sakai et al. | 180/204 |
| 6,018,692 | * 1/2000 | Shimizu et al. | 180/204 |

FOREIGN PATENT DOCUMENTS

| | | |
|---|---|---|
| 3-74256 | 3/1991 | (JP) . |
| 4-55168 | 2/1992 | (JP) . |

* cited by examiner

*Primary Examiner*—Brian L. Johnson
*Assistant Examiner*—Matthew Luby
(74) *Attorney, Agent, or Firm*—Arent Fox Kintner Plotkin & Kahn, PLLC

(57) ABSTRACT

An automatic steering device for a vehicle is provided to prevent an automatically steered vehicle from going out of its predetermined locus of movement as a result of an abnormal output of a movement distance detecting device. An actuator control device controls a steering actuator based upon the distance of movement detected by the movement distance detecting device and upon a locus of movement of the vehicle stored in a storage device. A judging device compares a vehicle speed estimated by a vehicle speed estimating device with an actual vehicle speed calculated by an actual vehicle speed detecting device from the distance of movement based upon the operating condition (shift range, accelerator opening degree and brake operating amount) of the vehicle detected by an operating condition detecting device. When the movement distance detecting device or the actual vehicle speed detecting device is judged to be abnormal, a discontinuing device discontinues the operation for controlling the steering actuator which is based on an actuator control device.

16 Claims, 5 Drawing Sheets

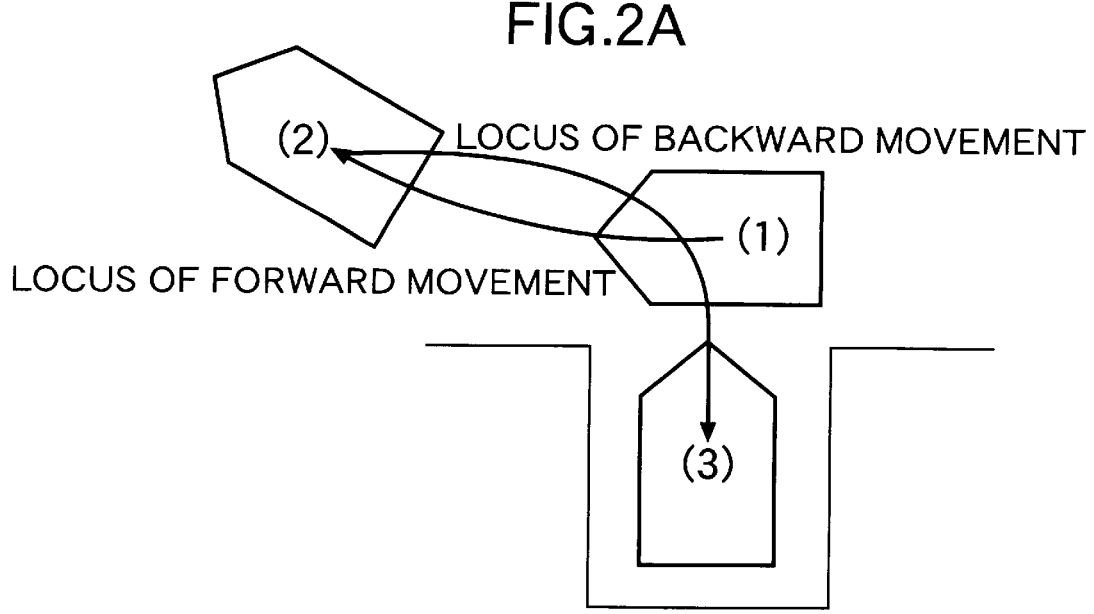
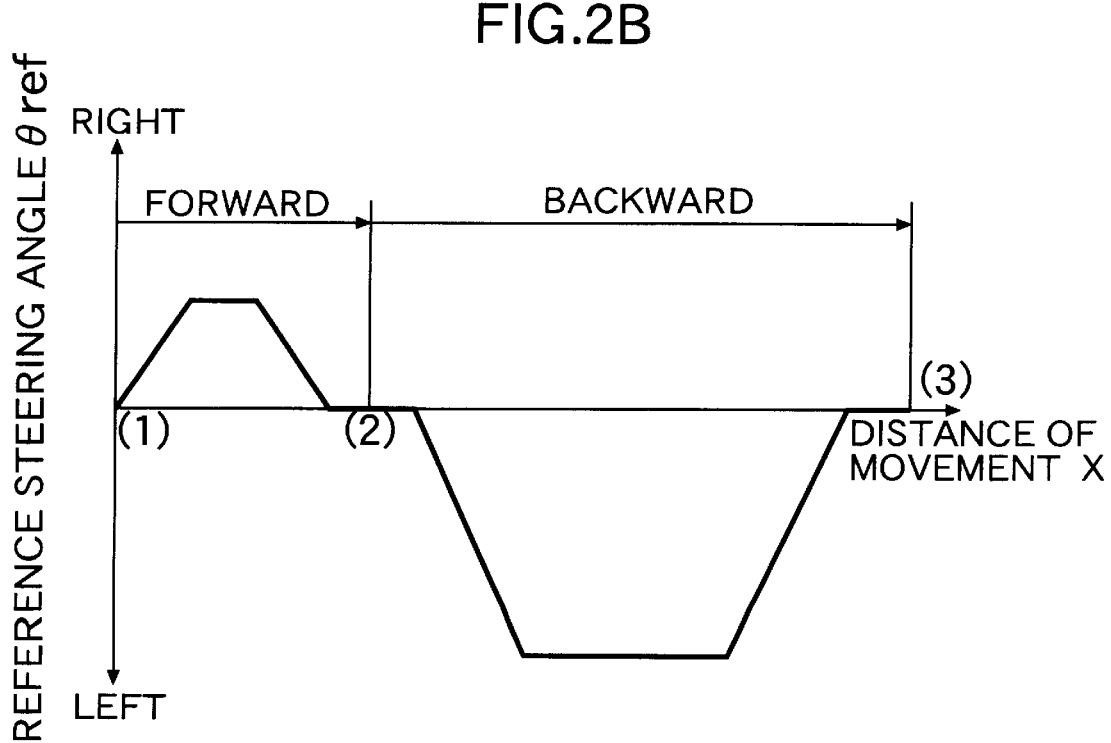

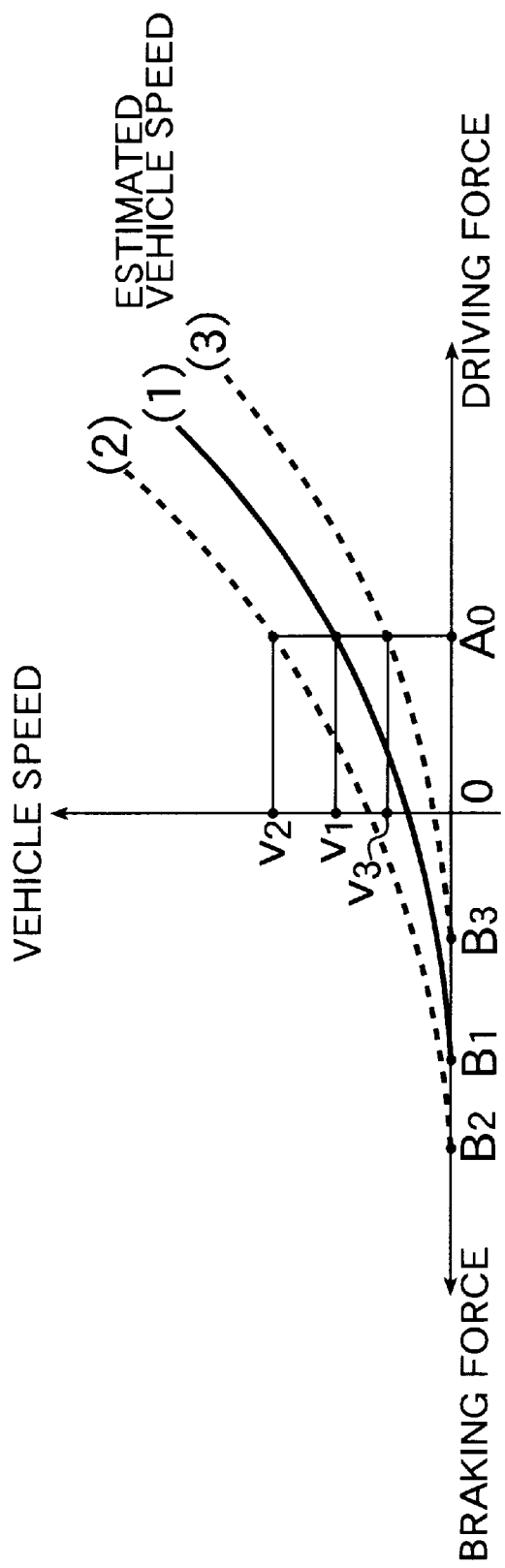
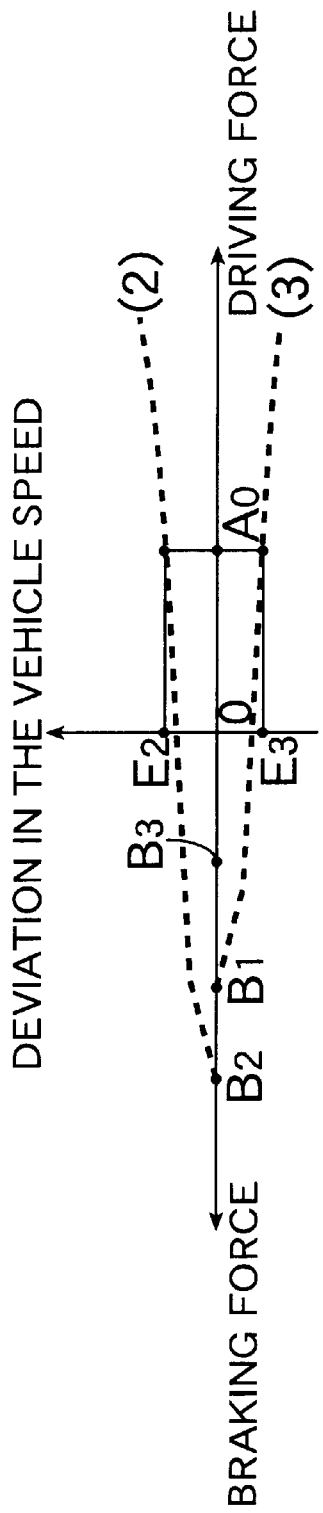
FIG.4A
FIG.4B

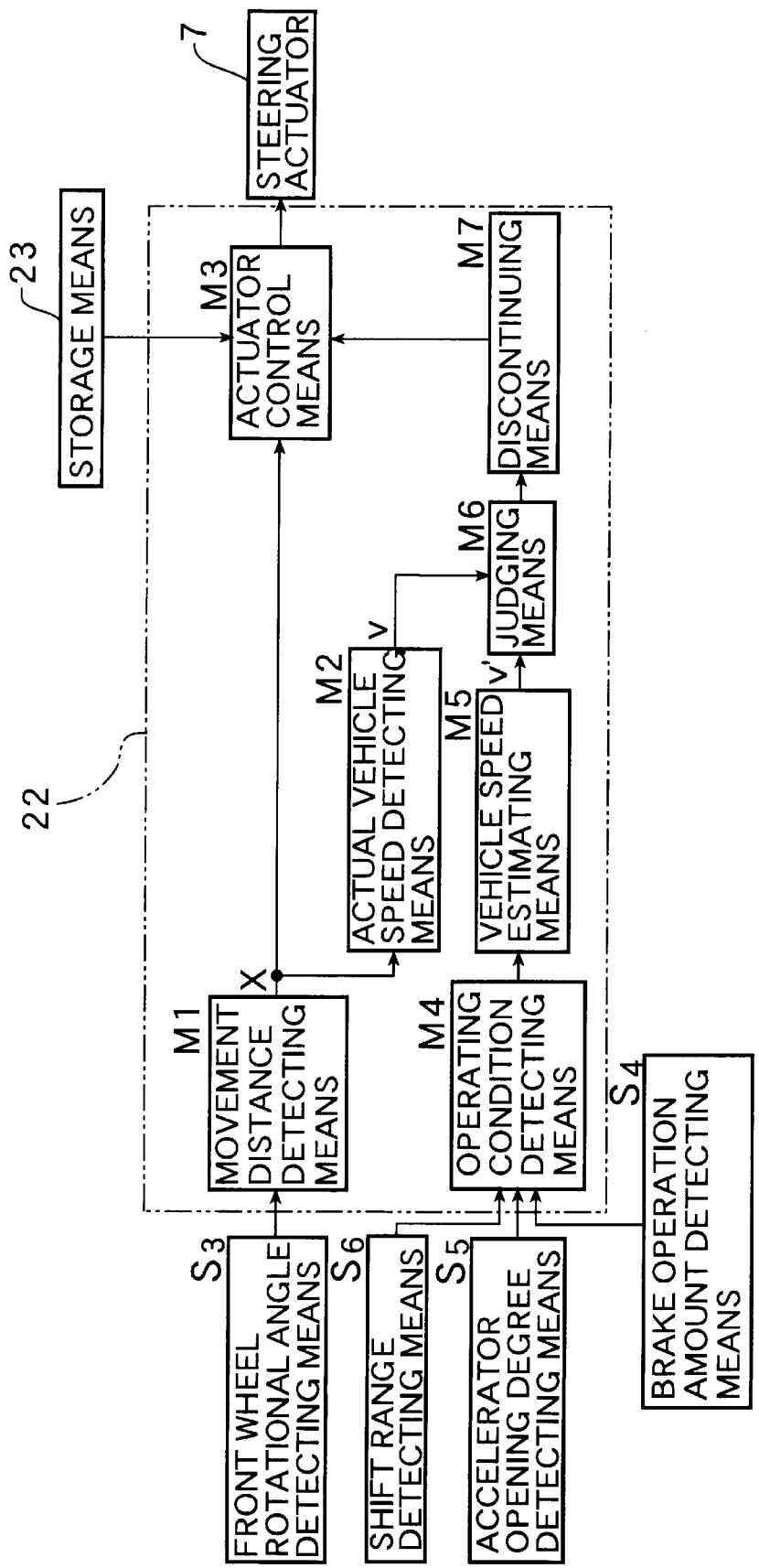

AUTOMATIC STEERING DEVICE FOR VEHICLES

BACKGROUND OF THE INVENTION

1. Field of the Invention

The present invention relates to an automatic steering device for vehicles for automatically parking the vehicle without relying upon the steering operation of the driver.

2. Description of the Prior Art

Automatic steering devices for vehicles are known already in Japanese Patent Applications Laid-Open Nos. 3-74256 and 4-55168. These automatic steering devices for vehicles utilize an actuator of a widely known electric power steering system, and are designed to automatically effect reverse parking or longitudinal parking by controlling the actuator based on a relationship between the distance of movement of the vehicle and the steering angle, that has been previously stored.

According to the conventional device in which the actuator is controlled based upon a relationship between the distance of movement of the vehicle and the steering angle that has been stored in advance, the vehicle is likely to go out of the predetermined locus of movement during the automatic steering operation when the distance of movement of the vehicle is not correctly detected or when the detection means becomes defective.

SUMMARY OF THE INVENTION

The present invention was accomplished in view of the above-mentioned circumstances. It is the object of the present invention to prevent the vehicle from departing from the predetermined locus of movement by discontinuing the automatic steering control operation upon detecting an abnormal condition of the movement distance detecting means.

In order to accomplish the above-mentioned object, the present invention is directed to an automatic steering device for vehicles comprising an actuator for steering the wheels, a movement distance detecting means for detecting the traveling distance of a vehicle, and a movement locus setting means for storing or calculating a locus of movement of the vehicle up to a target position as a relationship of the steering angle to the distance of movement of the vehicle. An actuator control means controls the driving of the actuator based upon the locus of movement set by the movement locus setting means and upon the distance of movement of the vehicle and a judging means judges the output of the movement distance detecting means to determine if the output is abnormal. A discontinuing means discontinues the operation for controlling the actuator by an actuator control means when the judging means has judged the output to be abnormal.

When the judging means judges the output of the movement distance detecting means to be abnormal, the discontinuing means discontinues the operation for controlling the actuator which is based on the actuator control means. Therefore, the automatic steering control operation is not conducted based upon an incorrect distance of movement of the vehicle, and the vehicle is prevented from being guided to a position which is spaced from a target position.

The present invention further comprises an actual vehicle speed detecting means for detecting the actual vehicle speed of the vehicle based upon the output of the movement distance detecting means. An abnormal condition of the movement distance detecting means is thus detected based upon an abnormal actual speed detected by the actual vehicle speed detecting means. The present invention further comprises an operating condition detecting means for detecting the operating condition of the vehicle, and a vehicle speed estimating means for estimating the vehicle speed based upon the operating condition of the vehicle detected by the operating condition detecting means, wherein the judging means judges the output of the movement distance detecting means to be abnormal based upon a deviation between the actual vehicle speed detected by an actual vehicle speed detecting means and the estimated vehicle speed determined by the vehicle speed estimating means. The vehicle speed is thus estimated by the vehicle speed estimating means relying upon the operating condition of the vehicle detected by the operating condition detecting means, and an abnormal condition of the movement distance detecting means is judged based upon the deviation between the estimated vehicle speed and the actual vehicle speed.

The operating condition of the vehicle is at least one operating condition of a transmission operating member, a brake operating member or an accelerator operating member. Accordingly, the operating condition of the vehicle can be properly judged.

Still further, the judging means judges the output of the movement distance detecting means to be abnormal when it is detected by the operating condition detecting means that the transmission operating member is at a traveling position and the brake operating member is at a non-operating position, and when it is detected by the actual vehicle speed detecting means that the vehicle is stopped.

The judging means thus judges the output of the movement distance detecting means to be abnormal when it is detected that the vehicle is stopped under the condition where the transmission operating member is at a traveling position, the brake operating member is at the non-operating position and the vehicle is traveling. Therefore, an abnormal condition can be correctly judged.

The judging means judges the output of the movement distance detecting means to be abnormal when it is detected by the operating condition detecting means that the accelerator operating member is at an operating position and when it is detected by the actual vehicle speed detecting means that the vehicle is stopped. The judging means judges the output of the movement distance detecting means to be abnormal when it is detected that the vehicle is stopped under the condition where the accelerator operating member is at the operating position and the vehicle is traveling. Therefore, an abnormal condition can be correctly judged.

The judging means also judges the output of the movement distance detecting means to be abnormal when it is detected by the operating condition detecting means that the brake operating member is generating a braking force for bringing the vehicle to a stop and when it is detected by the actual vehicle speed detecting means that the vehicle is traveling. The judging means judges the output of the movement distance detecting means to be abnormal when it is detected that the vehicle is traveling under the condition where the brake operating member is generating a braking force for bringing the vehicle to a stop and the vehicle is at a stop. Therefore, an abnormal condition can be correctly judged.

The judging means also judges the output of the movement distance detecting means to be abnormal when it is detected by the operating condition detecting means that the brake operating member is generating a braking force for bringing the vehicle to a stop and the accelerator operating member is in the non-operating position and when it is detected by the actual vehicle speed detecting means that the vehicle is traveling. The judging means thus judges the output of the movement distance detecting means to be abnormal when it is detected that the vehicle is traveling under the condition where the brake operating member is generating a braking force for bringing the vehicle to a stop, the accelerator operating member is at the non-operating position, and the vehicle is at a stop. Therefore, an abnormal condition can be correctly judged.

The judging means also judges the output of the movement distance detecting means to be abnormal when the transmission operating member is at the parking position and when it is detected by the actual vehicle speed detecting means that the vehicle is traveling. Accordingly, the judging means judges the output of the movement distance detecting means to be abnormal when it is detected that the vehicle is traveling under the condition where the transmission gearing member is in the parking position and the vehicle is at a stop.

BRIEF DESCRIPTION OF THE DRAWINGS

An embodiment for carrying out the present invention will now be described by way of an example shown in the accompanying drawings.

FIGS. 2A and 2B are diagrams illustrating the operation in a reverse parking/left mode.

FIGS. 4A and 4B are graphs illustrating a method of judging the abnormality of an actual vehicle speed detecting means.

FIG. 5 is a block diagram of a control system according to the embodiment of the present invention.

DETAILED DESCRIPTION OF THE PREFERRED EMBODIMENT

Figure 1:
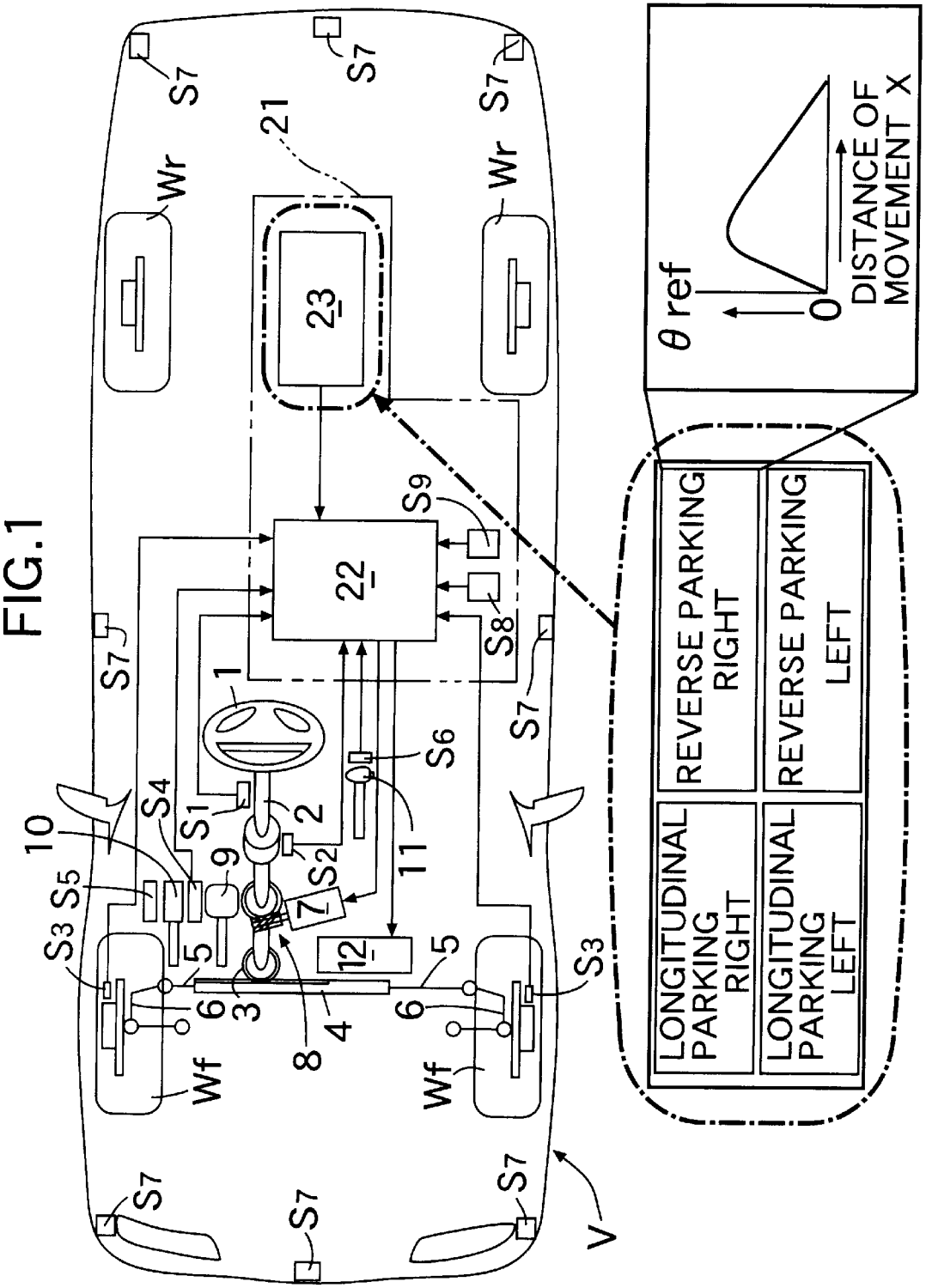
FIG. 1 is a diagram illustrating a vehicle equipped with a steering control device according to an embodiment of the present invention.

As shown in FIG. 1, a vehicle V includes a pair of front wheels Wf, Wf and a pair of rear wheels Wr, Wr. A steering wheel 1 and the front wheels Wf, Wf, which are the steered wheels, are connected together through a steering shaft 2 that rotates together with the steering wheel 1, a pinion 3 provided at a lower end of the steering shaft 2, a rack 4 meshed with the pinion 3, right and left tie rods 5, 5 provided at both ends of the rack 4, and right and left steering knuckles 6, 6 connected to the tie rods 5. A steering actuator 7 comprising an electric motor is connected to the steering shaft 2 through a worm gear mechanism 8 in order to assist the driver in operating the steering wheel 1 or to conduct automatic steering for garaging of the vehicle which will be described below.

A steering control unit 21 is comprised of a controller 22 and a storage means 23. The controller 22 receives a signal from a steering angle detecting means S1 for detecting a steering angle θ of the front wheels Wf, Wf based on the rotational angle of the steering wheel 1, a signal from a steering torque detecting means S2 for detecting a steering torque of the steering wheel 1, signals from front wheel rotational angle detecting means S3, for detecting rotational angles of the right and left front wheels Wf, Wf, a signal from a brake operation amount detecting means S4 for detecting the operating amount (brake operating amount) of a brake pedal 9, a signal from an accelerator opening-degree detecting means S5 for detecting the operating amount (accelerator opening-degree) of an accelerator pedal 10, a signal from a shift range detecting means S6 for detecting the shift range selected by a select lever 11 ("D" range, "R" range, "N" range, "P" range, etc.), and signals from a total of eight object detecting means S7, mounted at a front portion, a central portion and a rear portion of the vehicle V. The object detecting means S7, may be of any known type, such as sonar, radar, television camera or the like. Lines connecting the eight object detecting means S7, and the controller 22 are omitted from the drawing to simplify the drawing.

Figure 3:
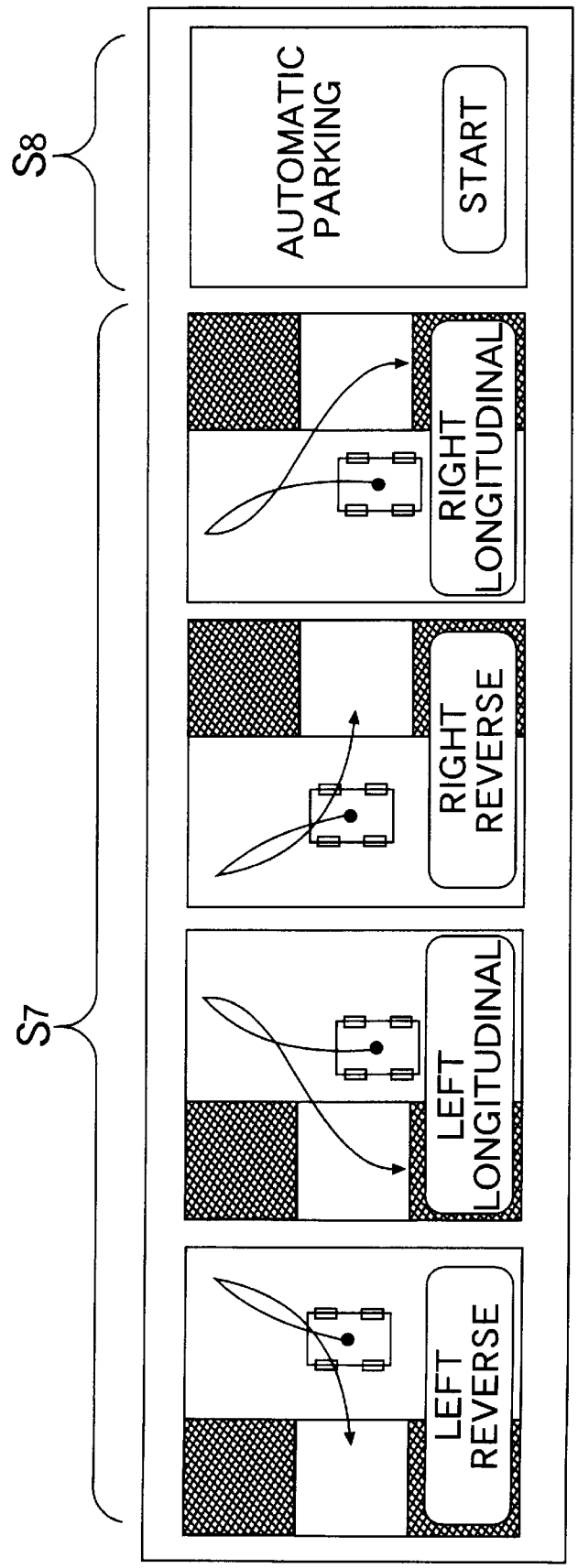
FIG. 3 is a diagram illustrating mode selecting switches and an automatic parking start switch according to the embodiment of the present invention.

A mode selecting switch S8 and an automatic parking start switch S9, which are both operated by the driver, are connected to the controller 22. As will be apparent from FIG. 3, the mode selecting switch S8 is operated at the time of selecting any one of four parking modes, i.e., a reverse parking/right mode, a reverse parking/left mode, a longitudinal parking/right mode and a longitudinal parking/left mode, and includes four switch buttons corresponding to these modes. The automatic parking start switch S9 is operated to start automatic parking in any mode selected by the mode selecting switch S8.

The storage means 23 is the movement locus setting means of the present invention, in which the data for the four parking modes, i.e., relationships of reference steering angles θref relative to distances of movement X of the vehicle V, are stored in advance as a table.

The controller 22 controls the operation of the steering actuator 7 and the operation of an operating stage display device 12 including a liquid crystal monitor, a speaker, a lamp, a chime, a buzzer or the like, based on the signals from the detecting means S1 to S7 and the switches S8, S9, and on the data of the parking modes stored in the storage means 23.

The brake pedal 9, the accelerator pedal 10 and the select lever 11, are respectively, the brake operating means, the accelerator operating means and the transmission gearing means of the present invention.

The controller 22 controls the operation of the steering actuator 7 based upon the data of the parking mode stored in the storage means 23 and the traveling distance of the vehicle V. Here, however, when the traveling distance X of the vehicle V is not correctly detected, an error occurs in the locus of movement, and the vehicle V cannot be guided to the target position. When the traveling distance X of the vehicle V is detected as being abnormal, therefore, the controller 22 discontinues the automatic steering control operation.

As shown in FIG. 5, therefore, the controller 22 includes a movement distance detecting means M1, an actual vehicle speed detecting means M2, an actuator control means M3, an operating condition detecting means M4, a vehicle speed estimating means M5, a judging means M6 and a discontinuing means M7.

The movement distance detecting means M1 detects the distance of movement X of the vehicle V based upon signals from the front wheel rotational angle detecting means S3, S3. The actual vehicle speed detecting means M2 detects the actual vehicle speed v of the vehicle V by differentiating the distance of movement X. The actuator control means M3 finds a reference steering angle θref by adapting the distance of movement X of the vehicle V detected by the movement distance detecting means M1 to the data of the parking mode stored in the storage means 23, and controls the steering actuator 7 so that the reference steering angle θref is obtained.

The operating condition detecting means M4 detects the operating condition (brake operating amount, accelerator opening degree and shift range) of the vehicle V based upon signals from the brake operation amount detecting means S4, the accelerator opening degree detecting means S5 and the shift range detecting means S6. The vehicle speed estimating means M5 calculates the estimated vehicle speed v' based upon the operating condition of the vehicle V. The judging means M6 compares the actual vehicle speed v with the estimated vehicle speed v', and judges, when the deviation is equal to or greater than a predetermined value, that the actual vehicle speed detecting means M2 is not outputting a correct actual vehicle speed equal to or v. When the actual vehicle speed detecting means M2 is not outputting the correct actual vehicle speed v, the discontinuing means M7 discontinues the automatic steering control operation which is based on the actuator control means M3.

The operation of the embodiment of the present invention having the above-described arrangement will be described below.

When the vehicle is in a normal state in which automatic parking is not carried out (when the automatic parking start switch S9 is not turned on), the steering control unit 21 functions as a general power steering control unit. More specifically, when the steering wheel 1 is operated by the driver to turn the vehicle V, the steering torque detecting means S2 detects a steering torque inputted to the steering wheel 1, and the controller 22 controls the driving of the steering actuator 7 based on the steering torque. As a result, the right and left front wheels Wf, Wf are steered by the driving force from the steering actuator 7, whereby the steering operation provided by the driver is assisted.

Next, the automatic parking control will be described with reference to the reverse parking/left mode (the mode in which the vehicle V moves back to a parking position on the left side of the vehicle V).

First, as shown in FIG. 2A, the vehicle V, is moved near to a garage where the vehicle V is to be parked. In a state in which the left side of the vehicle body is located as close as possible to an inlet line of the garage, the vehicle V is stopped at a position (a start position ①) at which a predetermined reference point (e.g., a mark formed on the inside of the door or a left side-view mirror) is matched with a center line of the garage. The mode selecting switch S8 is operated to select the reverse parking/left mode and the automatic parking start switch S9 is turned on to start the automatic parking control operation. While the automatic parking control operation is being carried out, the operating stage display device 12 displays the present position of the vehicle, obstacles surrounding the vehicle, a parking position, a presumed locus of movement of the vehicle from the start position to the parking position, a reversing position at the place where the forward movement is changed into the backward movement, etc. and, at the same time, notifies the driver of various instructions such as operating the select lever 11 at the reversing position by voice from a speaker as well as alarm.

Owing to the automatic parking control operation, the driver loosens the brake pedal 9 and lets the vehicle V creep or slightly depresses the accelerator pedal 10 to move the vehicle V. Without the need of operating the steering wheel 1, therefore, the front wheels Wf, Wf are automatically steered based upon the data of the reverse parking/left mode selected by the mode selecting switch S8. That is, while the vehicle V moves forward from the start position ① to the reversing position ②, the front wheels Wf, Wf are automatically steered toward the right and while the vehicle V moves backward from the reversing position ② to a target position ③, the front wheels Wf, Wf are automatically steered toward the left.

As can be seen from FIG. 2B, while the automatic steering is being carried out, the controller 22 searches the reference steering angle θref by adapting the distance of movement X of the vehicle V detected by the movement distance detecting means M1 to the data of the reverse parking/left mode read out from the storage means 23. Then, the controller 22 calculates a deviation E=(θref−θ) based on the reference steering angle θref and the steering angle θ inputted from the steering angle detecting means S1, and controls the operation of the steering actuator 7, so that the deviation E becomes 0. At this time, the data of the reference steering angle ref has been set in correspondence to the distance of movement X of the vehicle V. Hence, despite a small variation in the vehicle speed during the automatic steering control operation, the vehicle V always moves along the above-described locus of movement as long as the distance of movement X is correctly detected.

The automatic parking control is canceled when the driver turns the mode selecting switch S8 off, as well as when the driver operates the steering wheel 1, when an obstacle is detected by any one of the object detecting means S7, when the actual vehicle speed v exceeds a predetermined value, or when the movement distance detecting means M1 no longer detects a correct distance of movement X. Then, the normal power steering control is resumed.

Next, described below is the operation of the case when the movement distance detecting means M1 does not detect a correct distance of movement X and, as a result, the automatic parking control operation is discontinued.

The operating condition detecting means M4 detects the operating condition of the vehicle V based on the brake operating amount detected by the brake operating amount detecting means S4, accelerator opening degree detected by the accelerator opening degree detecting means S5 and the shift range detected by the shift range detecting means S6. Then, based on the result of the detection, the vehicle speed estimating means M5 calculates an estimated vehicle speed v depending upon the operating condition of the vehicle V. The judging means M6 compares the actual vehicle speed v with the estimated vehicle speed v'. When a deviation between the two vehicle speeds v and v' exceeds a predetermined value, the judging means M6 judges that the actual vehicle speed detecting means M2 is no longer correctly detecting the actual vehicle speed v. That the actual vehicle speed detecting means M2 detects no longer correctly the actual vehicle speed v means that the movement distance detecting means M1 is not correctly detecting the distance of movement X. Accordingly, the judging means M6 substantially judges whether the output of the movement distance detecting means M1 is abnormal. Then, the discontinuing means M7 discontinues the automatic steering control operation which is based on the actuator control means M3, and the vehicle is prevented from going out of the proper locus of movement.

Referring to a graph of FIG. 4A, the right side of the abscissa represents the driving force that varies depending upon the operation of the accelerator pedal 10, the left side of the abscissa represents the braking force that varies depending upon the operation of the brake pedal 9, and the ordinate represents the vehicle speed. A line ① represents an estimated vehicle speed v' when the vehicle travels on a flat road carrying a standard load, a line ② represents an estimated vehicle speed v' when the vehicle travels on a downhill carrying a minimum load, and a line ③ represents an estimated vehicle speed v' when the vehicle travels on an uphill carrying a maximum load. In the cases of these lines ① to ③, when the braking force becomes greater than B1 to B3, the driving force due to the creeping of the vehicle v' is canceled, and the estimated vehicle speed v' becomes 0. The gear ratio of the transmission differs depending upon whether the shift range is on the forward range or on the reverse range. Therefore, the above-mentioned graph is replaced depending upon the shift range.

As will be apparent from the above-mentioned graph, the estimated vehicle speed v' increases with an increase in the operating amount of the accelerator pedal 10 and with a decrease in the operating amount of the brake pedal 9. When the actual vehicle speed v detected by the actual vehicle speed detecting means M2 lies outside of the line ② or the line ③, the actual vehicle speed v is abnormal and the actual vehicle speed detecting means M2 (i.e., movement distance detecting means M1) is judged to be abnormal. When the driving force is $A_0$, the estimated vehicle speed v' is $v_1$ in the standard state ①, is $v_2$ which is larger than $v_1$ in the low-load state ②, and is v which is smaller than $v_1$ in the high-load state ③. When the actual vehicle speed v becomes greater than $v_2$ or smaller than $v_3$, the movement distance detecting means M1 is judged to be abnormal which may result from a defective front wheel rotational angle detecting means S3.

A graph of FIG. 4B is rewritten from the graph of FIG. 4A. The ordinate represents a deviation between the actual vehicle speed v and the estimated vehicle speed v'. By using this graph, also, the movement distance detecting means M1 can be judged to be abnormal which may result from a defective front wheel rotational angle detecting means S3 when the deviation lies over the line ② that represents the low-load state or under the line ③ that represents the high-load state. When the driving force is, for example, $A_0$, the movement distance detecting means M1 is judged to be abnormal provided the deviation is greater than E2 or smaller than E3.

Even when the deviation between the actual vehicle speed v and the estimated vehicle speed v' lies within a normal range, the actual vehicle speed detecting means M2 is judged to be abnormal when the following conditions (a) to (e) occur.

(a) When the select lever 11 is in the traveling range ("D" range or "R" range), the vehicle V will be traveling provided the brake operating amount detecting means S4 is not detecting the operation of the brake pedal 9. When the actual vehicle speed v is not detected despite of the above state, the actual vehicle speed detecting means M2 can be judged to be abnormal, i.e., the movement distance detecting means M1 can be judged to be abnormal.

(b) When the accelerator opening degree detecting means S5 is detecting the operation of the accelerator pedal 10, the vehicle V will be traveling except in the state in which the accelerator pedal 10 and the brake pedal 9 are operated simultaneously or except in the state in which the select lever 11 is in the non-traveling range ("N" range or "P" range) and the engine E is running with no load. When the actual vehicle speed v is not detected despite of the state, the actual vehicle speed detecting means M2 can be judged to be abnormal.

(c) When the brake operating amount detecting means S4 is generating a braking force greater than B2 in FIGS. 4A and 4B, the vehicle V will be stopped except in the special state in which the brake pedal 9 and the accelerator pedal 10 are operated simultaneously. When the actual vehicle speed v is detected despite of this state, the actual vehicle speed detecting means M2 can be judged to be abnormal.

(d) The vehicle V will be stopped when the brake operating amount detecting means S4 is generating a braking force greater than B2 in FIGS. 4A and 4B and when the accelerator opening degree detecting means S5 is not detecting the operation of the accelerator pedal 10. When the actual vehicle speed v is detected despite of this state, then, the actual vehicle speed detecting means M2 can be judged to be abnormal.

(e) When the select lever 11 is in the parking range ("P" range), the vehicle V will be stopped. When the actual vehicle speed v is detected despite this fact, then, the actual vehicle speed detecting means M2 can be judged to be abnormal.

The movement distance detecting means M1 in the present invention is not limited to one that detects the distance of movement X based on the rotational angles of the wheels but may be one that detects the distance of movement relying upon any other method. Furthermore in the embodiment, the locus of movement of the vehicle V up to the target position is stored in advance in the storage means 23. However, the locus of movement can be calculated from the present position of the vehicle V and the target position.

When the judging means judges the output of the movement distance detecting means to be abnormal, the discontinuing means discontinues the operation for controlling the actuator which is based on the actuator control means. Therefore, the automatic steering control operation is not effected based on an erroneous distance of movement of the vehicle, and the vehicle is prevented from being guided to a position away from the target position.

An abnormal condition of the movement distance detecting means is detected based upon the abnormal actual vehicle speed detected by the actual vehicle speed detecting means.

The vehicle speed is estimated by the vehicle speed estimating means based on the operating condition of the vehicle detected by the operating condition detecting means, and an abnormal output of the movement distance detecting means is judged based on a deviation between the estimated vehicle speed and the actual vehicle speed, making it possible to correctly judge an abnormal condition. Thus, the operating condition of the vehicle can be properly judged.

The judging means judges the output of the movement distance detecting means to be abnormal when it is detected that the vehicle is stopped in the condition where the transmission operating member is in the traveling position, the brake operating member is at the non-operating position, and the vehicle is traveling. Therefore, an abnormal condition is correctly judged.

Further the judging means judges the output of the movement distance detecting means to be abnormal when it is detected that the vehicle is stopped in the condition where the accelerator operating member is in the operating position and the vehicle is traveling, making it possible to correctly judge an abnormal condition.

Still further, the judging means judges the output of the movement distance detecting means to be abnormal when it is detected that the vehicle is traveling under the condition where the brake operating member is generating a braking force to bring the vehicle to a stop and the vehicle is stopped, making it possible to correctly judge an abnormal condition.

Further, the judging means judges the output of the movement distance detecting means to be abnormal when it is detected that the vehicle is traveling under the condition where the brake operating member is generating a braking force to bring the vehicle to a stop, the accelerator operating member is in the non-operating position and the vehicle is stopped, making it possible to correctly judge an abnormal condition.

Also, the judging means judges the output of the movement distance detecting means to be abnormal when it is detected that the vehicle is traveling under the condition where the transmission operating member is in the parking position and the vehicle is stopped, making it possible to correctly judge an abnormal condition.

Though the present invention was described above in detail by way of embodiments, it should be noted that the invention can be modified in a variety of ways without departing from the spirit and scope of the invention.

What is claimed is:

1. An automatic steering device for a vehicle comprising:
   an actuator for steering wheels of the vehicle;
   a movement distance detecting means for detecting a distance of movement of the vehicle;
   an actual vehicle speed detecting means coupled to the movement distance detecting means, for detecting an actual vehicle speed of the vehicle based upon an output of the movement distance detecting means;
   a movement locus setting means for storing a locus of movement of the vehicle to a target position as a relationship between a steering angle and the distance of movement of the vehicle;
   an actuator control means coupled to the movement locus setting means, for controlling a driving of the actuator based upon the locus of movement set by the movement locus setting means and upon the distance of movement of the vehicle;
   an operating condition detecting means for detecting an operating condition of the vehicle;
   a vehicle speed estimating means for estimating the vehicle speed based upon the operating condition of the vehicle detected by the operating condition detecting means;
   a judging means for judging an output of the movement distance detecting means to be abnormal based upon a deviation between the actual vehicle speed detected by the actual vehicle speed detecting means and the estimated vehicle speed estimated by the vehicle speed estimating means; and
   a discontinuing means coupled to the actuator control means for discontinuing an operation for controlling the actuator by the actuator control means when the judging means judges the output to be abnormal.

2. An automatic steering device for a vehicle according to claim 1, wherein the operating condition of the vehicle is at least one operating condition of a transmission operating member, a brake operating member and an accelerator operating member.

3. An automatic steering device for a vehicle according to claim 2, wherein the judging means judges the output of the movement distance detecting means to be abnormal when the operating condition detecting means detects that the transmission operating member is at a traveling position and the brake operating member is at a non-operating position, and the actual vehicle speed detecting means detects that the vehicle is stopped.

4. An automatic steering device for a vehicle according to claim 2, wherein the judging means judges the output of the movement distance detecting means to be abnormal when the operating condition detecting means detects that the accelerator operating member is in an operating position and the actual vehicle speed detecting means detects that the vehicle is stopped.

5. An automatic steering device for a vehicle according to claim 3, wherein the judging means judges the output of the movement distance detecting means to be abnormal when the operating condition detecting means detects that the accelerator operating member is in an operating position and the actual vehicle speed detecting means detects that the vehicle is stopped.

6. An automatic steering device for a vehicle according to claim 2, wherein the judging means judges the output of the movement distance detecting means to be abnormal when the operating condition detecting means detects the brake operating member generating a braking force for bringing the vehicle to a stop and when the actual vehicle speed detecting means detects that the vehicle is traveling.

7. An automatic steering device for a vehicle according to claim 2, wherein the judging means judges the output of the movement distance detecting means to be abnormal when the operating condition detecting means detects that the brake operating member is generating a braking force for bringing the vehicle to a stop and the accelerator operating member is at the non-operating position and the actual vehicle speed detecting means detects that the vehicle is traveling.

8. An automatic steering device for a vehicle according to claim 2, wherein the judging means judges the output of the movement distance detecting means to be abnormal when the transmission operating member is in a parking position and the actual vehicle speed detecting means detects that the vehicle is traveling.

9. An automatic steering device for a vehicle comprising:
   an actuator for steering wheels of the vehicle;
   a movement distance detecting means for detecting a distance of movement of the vehicle;
   an actual vehicle speed detecting means coupled to the movement distance detecting means for detecting an actual vehicle speed of the vehicle based upon an output of the movement distance detecting means;
   a movement locus setting means for calculating a locus of movement of the vehicle to a target position as a relationship between a steering angle and the distance of movement of the vehicle;
   an actuator control means coupled to the movement locus setting means, for controlling a driving of the actuator based upon the locus of movement set by the movement locus setting means and upon the distance of movement of the vehicle;
   an operating condition detecting means for detecting an operating condition of the vehicle;
   a vehicle speed estimating means for estimating the vehicle speed based upon the operating condition of the vehicle detected by the operating condition detecting means;
   a judging means for judging an output of the movement distance detecting means to be abnormal based upon a deviation between the actual vehicle speed detected by the actual vehicle speed detecting means and the estimated vehicle speed estimated by the vehicle speed estimating means; and
   a discontinuing means coupled to the actuator control means for discontinuing an operation for controlling the actuator by the actuator control means when the judging means judges the output to be abnormal.

10. An automatic steering device for a vehicle according to claim 2, wherein the operating condition of the vehicle is at least one operating condition of a transmission operating member, a brake operating member and an accelerator operating member.

11. An automatic steering device for a vehicle according to claim 10, wherein the judging means judges the output of the movement distance detecting means to be abnormal when the operating condition detecting means detects that the transmission operating member is at a traveling position and the brake operating member is at a non-operating position, and the actual vehicle speed detecting means detects that the vehicle is stopped.

12. An automatic steering device for a vehicle according to claim 10, wherein the judging means judges the output of the movement distance detecting means to be abnormal when the operating condition detecting means detects that the accelerator operating member is in an operating position and the actual vehicle speed detecting means detects that the vehicle is stopped.

13. An automatic steering device for a vehicle according to claim 11, wherein the judging means judges the output of the movement distance detecting means to be abnormal when the operating condition detecting means detects that the accelerator operating member is in an operating position and the actual vehicle speed detecting means detects that the vehicle is stopped.

14. An automatic steering device for a vehicle according to claim 10, wherein the judging means judges the output of the movement distance detecting means to be abnormal when the operating condition detecting means detects the brake operating member generating a braking force for bringing the vehicle to a stop and when the actual vehicle speed detecting means detects that the vehicle is traveling.

15. An automatic steering device for a vehicle according to claim 10, wherein the judging means judges the output of the movement distance detecting means to be abnormal when the operating condition detecting means detects that the brake operating member is generating a braking force for bringing the vehicle to a stop and the accelerator operating member is at the non-operating position and the actual vehicle speed detecting means detects that the vehicle is traveling.

16. An automatic steering device for a vehicle according to claim 10, wherein the judging means judges the output of the movement distance detecting means to be abnormal when the transmission operating member is in a parking position and the actual vehicle speed detecting means detects that the vehicle is traveling.

* * * * *